July 1, 1958

J. H. MINTZER 2,841,766

EXPANDED SCALE LINE METER

Filed Feb. 4, 1954

INVENTOR
JOHN H. MINTZER
BY
Michael Hertz
ATTORNEY

United States Patent Office 2,841,766
Patented July 1, 1958

2,841,766

EXPANDED SCALE LINE METER

John H. Mintzer, Williamsport, Pa., assignor to Sylvania Electric Products Inc., a corporation of Massachusetts Application February 4, 1954, Serial No. 408,186

5 Claims. (Cl. 324—131)

This invention relates to measuring instruments, particularly to instruments for measuring electrical potentials.

In many instances the observer is only interested in the magnitude of a voltage existing between certain limits well above zero and within those limits he would like to have an expanded scale for ease in determining the magnitude, without using too large a meter. With the circuit of my invention and a meter having an expanded scale running from substantially one of the limits to the other for the full deflection range of the indicator needle of the instrument, such a goal may be achieved.

It is, therefore, an object of the invention to provide a meter circuit which shall clearly indicate, on a scale, those voltages which are within certain limits well above the zero value, with the upper arm and lower limits of the scale substantially at the ends of the full deflection range of the movable indicator.

It is a further object of the invention to so design the circuit that the scale indications are linear and accurately indicate the voltages.

Figure 1:
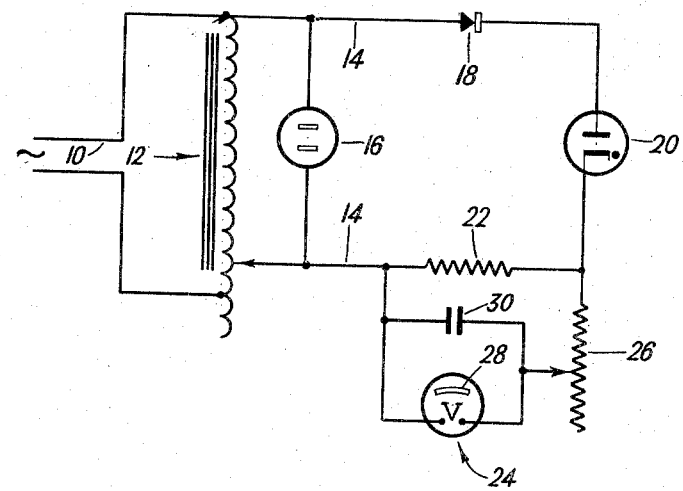
Figure 2:

Other and further objects will appear after reading the following specification in conjunction with the accompanying drawing in which Fig. 1 is a circuit diagram of the measuring circuit and which includes a voltmeter, and Fig. 2 is a view of a scale which may be employed in the voltmeter.

Considering the drawing more in detail, at 10 there is disclosed a source of A. C. line voltage feeding an autotransformer 12. Across the output of this transformer is placed the feed line 14, 14 to which may be connected one or more outlet receptacles 16. The voltage measuring circuit comprises a rectifier 18, a gas filled voltage regulator tube 20 and a current limiting resistor 22, all connected in series across the feed line 14, 14. Across the resistor 22 is the voltmeter 24 with its series connected calibrating variable resistance 26. This meter is provided with the expanded scale 28. If desired a condenser 30 may bridge the meter to damp meter needle vibrations.

In a practical application of the circuit, the circuit 10 may be a conventional 117½ volt line and the autotransformer 12 may be a "Variac."

The components selected are:

Selenium rectifier 18—100 ma. rectifier, Sylvania NC-5.
Resistor 22—200 ohms 10 watt, wirewound.
Resistor 26—20,000 ohm potentiometer, 2 watt.
Condenser 30—25 mfd., 25 v., electrolytic.
Meter 24—0–1 ma. D. C. meter.
Tube 20—Type VR-105.

This arrangement will give meter readings from the firing potential of the VR tube to the maximum line voltage reading afforded by the "Variac." When the "Variac" is started at 0 voltage and moved to maximum, it will be found that no meter reading will occur until the voltage on the tube 20 reaches approximately 90 volts. At that time the voltage peaks will fire the VR-105 and a slight meter reading will be obtained due to the small current flow through the tube. As the input voltage is increased, the meter action will be linear to full scale reading due to the linear current-flow-to-voltage characteristic of the VR type of tube.

For calibrating the meter 24 a standard A. C. meter may be temporarily connected across the feed line 14, 14, the autotransformer 12 turned fully on and the potentiometer 26 adjusted to give a maximum deflection of the needle. The scale may then be marked with the voltage indicated on the standard meter, as 130 volts.

The autotransformer is then adjusted to a lower reading on the regular A. C. meter, as 100 volts, and the indicator scale marked accordingly. Once the positions on the scale of these voltages are indicated, the standard A. C. meter may be removed. The scale may then be marked off linearly in voltages between the desired limits and within the range permissible by the action by the VR tube. The resistor 22 was selected to be of a value to provide for full scale deflection of the needle of the meter with the VR tube selected.

Having thus described the invention what is claimed as new is:

1. A measuring circuit comprising a gas filled voltage regulating tube, a resistor in series therewith, both being adapted to be placed across a line whose voltage is to be measured, a voltmeter having a scale calibrated in line voltage and an indicator movable over the scale, said voltmeter shunting the resistor, the indicator being near a point on the scale which is indicative of the breakdown voltage of the regulator tube when the meter is unenergized, the resistor being of a value to allow for full scale deflection of the indicator from the breakdown voltage of the tube to maximum line voltage.

2. A measuring circuit comprising a gas filled voltage regulating tube, a first resistor in series therewith, both being adapted to be placed across a line whose voltage is to be measured, a voltmeter having a scale calibrated in line voltage and an indicator movable over the scale, a variable resistor in series with said voltmeter, said voltmeter and variable resistor shunting the first resistor, the indicator being near a point on the scale which is indicative of the breakdown voltage of the regulator tube when the meter is unenergized, both resistors being of values to allow for full scale deflection of the indicator from the breakdown voltage of the tube to maximum line voltage.

3. A measuring circuit comprising in series connection, a rectifier, a gas filled voltage regulating tube, and a resistor, all adapted to be placed across a line whose voltage is to be measured, a voltmeter having a scale calibrated in line voltage and an indicator movable over the scale, said voltmeter shunting the resistor, the indicator being near a point on the scale which is indicative of the breakdown voltage of the regulator tube when the meter is unenergized, and the resistor being of a value to allow for full scale deflection of the indicator from the breakdown voltage of the tube to maximum line voltage.

4. A measuring circuit comprising in series connection, a rectifier, a gas filled voltage regulating tube, and a first resistor, all being adapted to be placed across a line whose voltage is to be measured, a voltmeter having a scale calibrated in line voltage and an indicator movable over the scale, a variable resistor in series with the voltmeter, said voltmeter and variable resistor shunting the first resistor, the indicator being near a point on the scale which is indicative of the breakdown voltage of the regulator tube when the meter is unenergized, both resistors being of values to allow for full scale deflection of the indicator from the breakdown voltage of the tube to maximum line voltage.

5. A measuring circuit comprising a gas filled voltage regulating tube and a first resistor in series therewith, with both across a line whose voltage is to be measured, a voltmeter in series with a variable resistor, one terminal of the series connected voltmeter and variable resistor being connected to one terminal of the first resistor and the other terminal of said series connected voltmeter and variable resistor being connected to the other terminal of said first resistor.

References Cited in the file of this patent

UNITED STATES PATENTS

| | | |
|---|---|---|
| 2,525,705 | Moore | Oct. 10, 1950 |
| 2,526,329 | Chamberlain | Oct. 17, 1950 |
| 2,575,996 | Bunblasky | Nov. 20, 1951 |

OTHER REFERENCES

Lawrence et al.: abstract of application Serial No. 650,370, published June 27, 1950, 635 O. G. 4.